United States Patent [19]

Ōhmura

[11] Patent Number: 4,653,217
[45] Date of Patent: Mar. 31, 1987

[54] REEL SEATS FOR FISHING RODS
[75] Inventor: Ryuichi Ōhmura, Shizuoka, Japan
[73] Assignee: Fuji Kogyo Co. Ltd., Japan
[21] Appl. No.: 731,371
[22] Filed: May 7, 1985
[30] Foreign Application Priority Data May 15, 1984 [JP] Japan .................................. 59-97295

[51] Int. Cl.⁴ ............................................. A01K 87/06
[52] U.S. Cl. ............................................ 43/20; 43/22
[58] Field of Search ............... 43/20, 22, 23, 18.5,
  43/18.1; 16/DIG. 19, DIG. 18, DIG. 12;
  D22/148, 142; 273/81 R

[56] References Cited
U.S. PATENT DOCUMENTS 206,264  7/1878  Robertson ............................ 43/23
4,077,150  3/1978  Barnes .................................. 43/23
4,398,369  8/1983  Wiebe ................................ 43/18.1
4,467,548  8/1984  Tabor .................................... 43/23
4,516,351  5/1985  Highby ................................ 43/23

Primary Examiner—Nicholas P. Godici
Assistant Examiner—G. M. Reid
Attorney, Agent, or Firm—Wegner & Bretschneider

[57] ABSTRACT

A cylindrical type reel seat for fishing rods including a finger grip on the lower surface of a body portion thereof, wherein:
a finger recess is formed adjacent to said finger grip, and said reel seat body portion includes a rod-passing bore of a reduced or small diameter only at the portion adjacent to said finger recess, said smaller diameter portion being designed to be fitted over said fishing rods.

4 Claims, 3 Drawing Figures

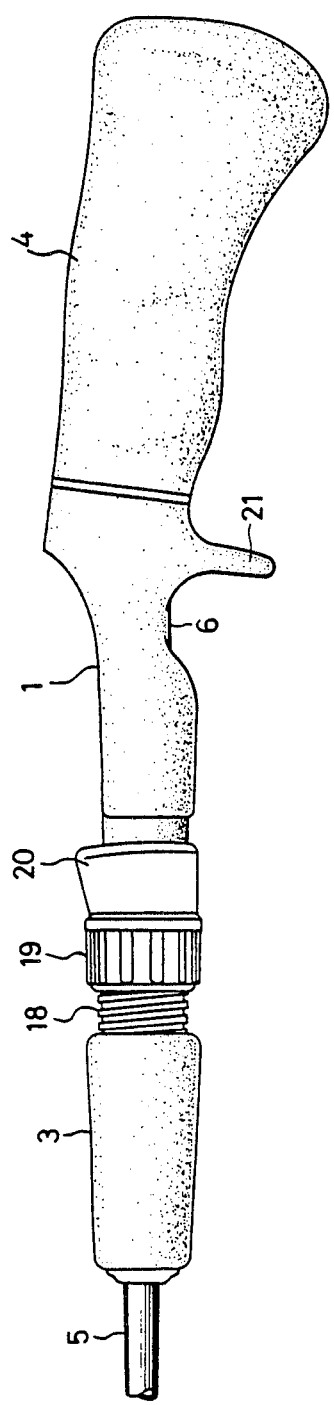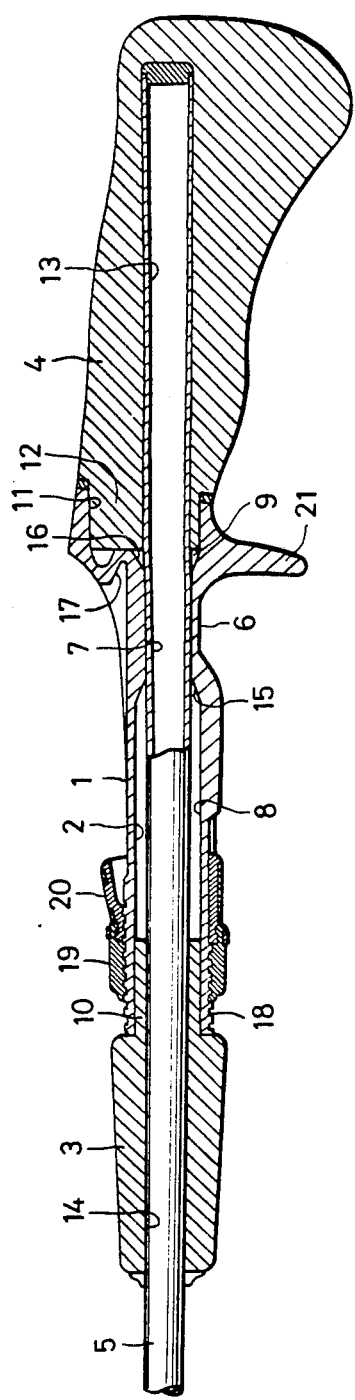

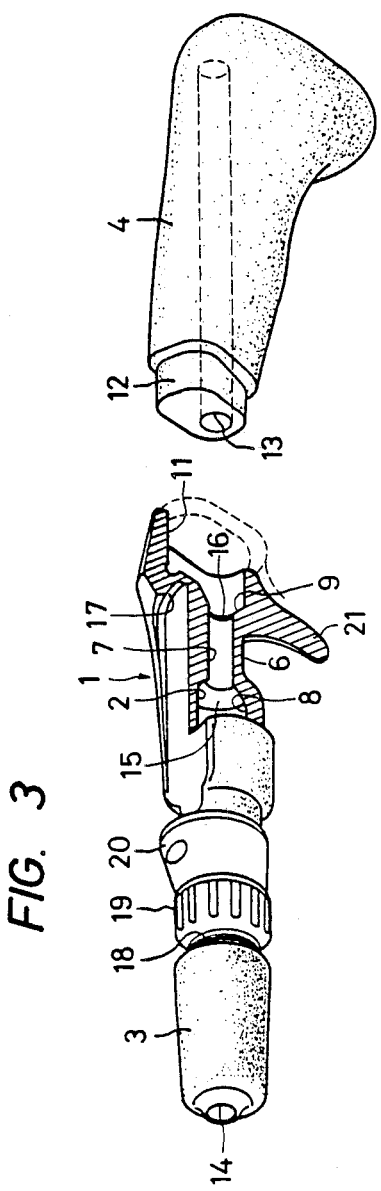

REEL SEATS FOR FISHING RODS

FIELD OF THE INVENTION

The present invention relates to improvements of reel seats to be fixed to fishing rods and, more specifically, to reel seats having improved sensitivity as well as fishing rods to which said reel seats are mounted.

BACKGROUND OF THE INVENTION

For instance, reel seats having improved sensitivity are known from U.S. Pat. No. 4,398,369 specification. Such reel seats are designed to transmit the vibration to fishermen's finger by forming a finger grip separately from other parts and a solid material approximate to that of the fishing rod. However, such a construction increases the number of parts and higher cost in assembling. In addition, such seat arrangements have the disadvantage that they are apt to easily come apart in the event even that they are attached to the fishing rods. Another type of the reel seat has been proposed, wherein a continuous reel seat body is formed of synthetic resin, and includes a finger grip having therein a window portion for direct finger touch on the rod. However, such a construction has a problem for enlarging a rod bore, since the drill tends to shift toward the window opening. Further as the reel seat structure having full length rod contact, a vibration is dispersed throughout the reel seat, so that it is difficult to receive vibration in specific position such as the window. Besides, that reel seat is so heavy in weight and, when bonding it to the associated fishing rod, a certain amount of adhesives flows out of the window to incur difficulty in finishing work.

SUMMARY OF THE INVENTION

According to the present invention, the number of the parts involved is reduced by forming a reel seat body in the successive form so as to curtail the production cost. The reel seat arrangement of the present invention is also reduced in weight by allowing only a part thereof in the vicinity of a finger recess to be of a smaller diameter portion adapted to be closely fitted over the fishing rod and providing a space portion with respect to other portion of a rod-passing bore. In addition, the thickness of the finger recess is reduced so as to receive rod vibration thereupon. In addition, a section to be drilled to adapt a larger diameter rod is short, thus provide uniform and straight bore.

BRIEF DESCRIPTION OF THE DRAWINGS

The foregoing and other objects and features of the present invention will become apparent from the following detailed description with reference to the accompanying drawings, and in which:

FIG. 1 is a side view showing one embodiment of reel seat according to the present invention, FIG. 2 is a longitudinally sectioned view of FIG. 1, and FIG. 3 is an exploded perspective view, partly sectioned, of that embodiment.

EXPLANATION OF THE PREFERRED EMBODIMENTS OF THE INVENTION

A reel seat 1 is formed of a hollow member of synthetic resin, which has therethrough a rod-passing bore 2. The reel seat 1 is fixed to a fishing rod 5 with fore and rear grips 3 and 4 which are formed of an elastic lightweight material such as foamed synthetic resin, or cork.

The reel seat 1 is provided with a finger recess 6. The bore 2 is comprised of a rod fitting portion 7 into which the fishing rod 5 is closely fitted into a region corresponding to the finger recess 6 and hollow portions 8 and 9 which have a diameter larger than that of the fishing rod 5 into which a fore grip 3 and rear grip 4 are fitted.

The fore grip 3 includes therethrough a rod bore 14 at the central portion, said bore 14, said portion 7 and said bore 13 being bonded to the fishing rod 5. The smaller diameter portion 10 of the fore grip 3 and the fore end of the rod-passing bore 2 as well as the recession 11 and the projection 12 of the rear grip 4 are fixed together by means of adhesives. It is to be noted that, in order to facilitate flowing of the adhesives into the rod fitting portion 7 of the reel seat 1, the juncture portions of said small diameter portion 7 and the hollow portion 8 and 9 are tapered at 15 and 16.

Reel seat 1 includes a cavity, a slidable seat 20, and a nut 19.

It is preferred that the thickness between the finger recess 6 and the rod fitting portion 7 is thin as much as possible. Further, a trigger 21 is formed on the lower surface of the reel seat 1 adjacent to the finger recess 6.

As explained above, since the reel seat 1 of the present invention is bonded to the fishing rod 5 only at the rod fitting portion 7 of the rod bore 2 corresponding to the finger recess 6 formed on the lower surface thereof, the vibration transmitted from the fishing line is concentrated in the rod fitting portion 7, so that it is sensitivity transmitted to the finger-tips through the finger recess 6. Since the rod fitting portion 7 is merely formed on a short part of the rod bore 2 in the reel seat 1, it is easy to drill uniformly for larger diameter rod. Except for the rod fitting portion 7, the rod bore 2 in the reel seat 1 is formed of a hollow portion bores 8 and 9 having a diameter larger than that of the fishing rod 5, so that the weight thereof is markedly reduced. In addition, since the reel seat 1 consists of only three parts, i.e., the body portion, the nut 19 and the slidable hood 20, thus leading to lower cost in easy assembling. Any finishing work such as to remove the excessive adhesives flowed from the window is dispensed with, thus resulting in a cut-down of the production cost.

What is claimed is:

1. A reel seat for a fishing rod, comprising:
   (A) an essentially cylindrical body portion having a first end for receiving a fore grip and a second end for receiving a rear grip
   (B) a finger grip;
   (C) a finger recess adjacent to the finger grip;
   (D) a bore passing through the body portion for receiving a rod therethrough, and
   (E) that part of the bore adjacent to the finger recess having a first diameter for attachment of said rod thereto; and
   (F) said bore having a portion of a second diameter greater than said first diameter extending from the area of said finger recess to said first end, said portion of said bore forming an annular chamber extending from the finger recess to the first end when said reel seat is mounted on said rod, thereby concentrating vibrations of the rod on the finger recess.

2. A real seat according to claim 1, said real seat further comprising: an adhesive disposed only in that part of the bore adjacent to the finger of the bore adjacent to the finger having said first diameter for attacment of said rod thereto.

3. A handle for a fishing rod comprising:
 (A) a reel seat having a first and a second end and a finger grip near said second end;
 (B) a fore grip affixed at said first end and a rear grip affixed at said second end;
 (C) a finger recess adjacent to the finger grip;
 (D) a bore passing through the reel seat for receiving a rod therethrough;
 (E) an adhesive disposed only in that part of the bore adjacent to the finger recess to affix said rod thereto; and
 (F) said bore having an enlarged portion extending from the area of said finger recess to said first end; said enlarged portion of said bore forming an annular chamber extending from the finger recess to the first end when said handle is mounted on said rod, thereby concentrating vibrations of the rod on the finger recess.

4. A fishing rod, comprising:
 (A) a reel seat having a first end and a second end, and a finger grip near said second end;
 (B) a fore grip affixed at said first end and a rear grip affixed at said second end;
 (C) a finger recess adjacent to the finger grip;
 (D) a bore passing through the reel seat;
 (E) a rod member passing through said bore;
 (F) an adhesive disposed only in that part of the bore adjacent to the finger recess to affix said rod thereto; and
 (G) said bore having the enlarged portion extending from the area of said finger recess to said first end, said enlarged portion of said bore, together with said rod member forming an annular chamber extending from the finger recess to the first end, thereby concentrating vibrations of the rod on the finger recess.

* * * * *